(12) United States Patent
Wykoff et al.

(10) Patent No.: US 8,246,109 B2
(45) Date of Patent: Aug. 21, 2012

(54) VEHICLE ROOF MODULE

(75) Inventors: Richard H. Wykoff, Commerce Township, MI (US); Matthew John Zaluzec, Canton, MI (US); Joy Hines Forsmark, Saint Clair Shores, MI (US); Jacob Wesley Zindel, Ann Arbor, MI (US); Brian J. Schneider, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/879,391

(22) Filed: Sep. 10, 2010

(65) Prior Publication Data

US 2012/0061997 A1    Mar. 15, 2012

(51) Int. Cl.
  *B60J 7/00* (2006.01)
(52) U.S. Cl. ............................ 296/216.08; 296/193.04
(58) Field of Classification Search ............ 296/216.01, 296/193.03, 193.04, 216.06–216.08, 219, 296/209, 215, 214, 216.09
See application file for complete search history.

(56) References Cited

U.S. PATENT DOCUMENTS

| | | | |
|---|---|---|---|
| 3,517,849 A * | 6/1970 | Presnick | 220/4.28 |
| 5,022,705 A * | 6/1991 | Takahashi | 296/213 |
| 5,029,937 A | 7/1991 | Yamamoto | |
| 5,100,197 A | 3/1992 | Ichinose et al. | |
| 5,104,178 A | 4/1992 | Bienert | |
| 5,332,282 A * | 7/1994 | Maeda et al. | 296/213 |
| 5,466,038 A | 11/1995 | Fujie et al. | |
| 5,540,478 A | 7/1996 | Schüch | |
| 5,941,598 A | 8/1999 | Cave et al. | |
| 6,129,413 A | 10/2000 | Klein | |
| 6,224,146 B1 * | 5/2001 | Willard et al. | 296/216.03 |
| 6,270,104 B1 * | 8/2001 | Nelson et al. | 280/281.1 |
| 6,460,920 B1 | 10/2002 | Reinsch | |
| 6,467,837 B1 * | 10/2002 | Tolinski | 296/216.07 |
| 6,513,865 B1 | 2/2003 | Lutz et al. | |
| 6,619,732 B2 | 9/2003 | Radmanic | |
| 6,644,728 B1 | 11/2003 | Nagashima et al. | |
| 6,817,658 B2 | 11/2004 | Ohnishi et al. | |
| 6,942,286 B2 | 9/2005 | Böhm et al. | |
| 7,073,851 B2 | 7/2006 | Seifert | |
| 7,077,462 B1 | 7/2006 | De Gaillard | |
| 7,243,989 B2 | 7/2007 | Manders | |
| 7,625,040 B2 | 12/2009 | Pollak et al. | |

(Continued)

FOREIGN PATENT DOCUMENTS

DE    4444072    * 12/1995

(Continued)

*Primary Examiner* — Dennis Pedder
(74) *Attorney, Agent, or Firm* — Brooks Kushman P.C.; Ray Coppiellie (57) ABSTRACT

A vehicle roof module includes a front extruded cross member, a first pair of nodes each received in an end region of the front cross member, a first and a second extruded side rail with each end region receiving one of the first pair of nodes, a second pair of nodes each received in another end region of the first and second rails, a rear extruded cross member with each end region receiving one of the second pair of nodes, and a panel mounted to the front cross member, rear cross member, and first and second side rail. Each end region of each side rail defines an interior hollow portion and has at least one nodule extending from the side rail into the hollow portion to maintain a bond gap between the side rail and the node received into the side rail end region for receiving adhesive.

8 Claims, 5 Drawing Sheets

U.S. PATENT DOCUMENTS

| | | |
|---|---|---|
| 2003/0015891 A1 | 1/2003 | Doll et al. |
| 2003/0137166 A1* | 7/2003 | Tamura et al. ........... 296/216.09 |
| 2004/0075304 A1* | 4/2004 | Cocaign ........................ 296/214 |
| 2006/0108838 A1 | 5/2006 | Diez Esteban et al. |
| 2006/0284450 A1 | 12/2006 | Regnier et al. |
| 2008/0190922 A1* | 8/2008 | Kraeling ........................... 220/6 |
| 2009/0033128 A1 | 2/2009 | Hoelzel |
| 2010/0038932 A1 | 2/2010 | Comfort et al. |
| 2010/0038933 A1 | 2/2010 | Comfort et al. |
| 2010/0072783 A1 | 3/2010 | Fernholz et al. |
| 2010/0320808 A1* | 12/2010 | Marx et al. .................... 296/217 |

FOREIGN PATENT DOCUMENTS

| | | | | |
|---|---|---|---|---|
| JP | 0004627 | * | 1/1983 | ................... 296/215 |

* cited by examiner

VEHICLE ROOF MODULE

BACKGROUND

1. Technical Field

Various embodiments relate to vehicle roof module assemblies.

2. Background Art

Vehicle roof module assemblies are mounted on vehicle bodies to enclose interiors of vehicle bodies. Roof module assemblies may include fixed panels or moveable panels where the panels slide or tilt relative to the vehicle to create an opening in the roof. Conventional panoramic roof modules are typically designed for a specific vehicle and may include fixed panels.

SUMMARY

In one embodiment, a vehicle roof module is provided with a front extruded cross member adapted to be mounted to a roof of a vehicle body and a first pair of nodes each having a portion received in an end region of the front cross member. The vehicle roof module has a first extruded side rail and a second extruded side rail with each end region of the first and second rails receiving another portion of one of the first pair of nodes. The vehicle roof module has a second pair of nodes each having a portion received in another end region of the first and second rails, and a rear extruded cross member adapted to be mounted to the roof of the vehicle body, with each end region of the rear cross member receiving another portion of one of the second pair of nodes. The vehicle roof module has a panel mounted to the front cross member, rear cross member, first side rail and second side rail. Each end region of each side rail defines an interior hollow portion. Each end region of each side rail has at least one nodule extending from the side rail into the hollow portion to maintain a bond gap between the side rail and the node received into the side rail end region for receiving adhesive.

A further embodiment discloses that each end region of the front cross member defines an interior hollow portion. The front cross member is provided with at least one nodule extending from each end region of the front cross member into the hollow portion to maintain a bond gap between the front cross member and the portion of the node received into the front cross member end region.

An even further embodiment discloses that each end region of the rear cross member defines an interior hollow portion. The rear cross member is provided with at least one nodule extending from each end region of the rear cross member into the hollow portion to maintain a bond gap between the rear cross member and the portion of the node received into the rear cross member end region.

A further embodiment provides an adhesive placed in the bond gaps for connecting each node to a respective end region.

An even further embodiment provides an intermediate cross member having a first end mounted to the first side rail and a second end mounted to the second side rail. The intermediate cross member is positioned between the front and rear cross members.

A further embodiment discloses that the panel is additionally supported by the intermediate cross member.

An even further embodiment discloses that the panel is generally transparent.

A further embodiment discloses that the panel is formed from one of a glass, acrylic, and polycarbonate material.

An even further embodiment provides a sun shade track in each side rail, a sun shade drive cable track in at least one of the side rails, and a sun shade drive cable return track in the at least one of the side rails.

A further embodiment provides a sun shade sized to generally cover the panel. The sun shade interacts with the sun shade track on the first side rail and the sun shade track on the second side rail.

An even further embodiment provides a sun shade motor mounted to the rear cross member, and a drive cable connecting the sun shade to the motor.

In another embodiment, a vehicle is provided with a vehicle body having a pair of pillars for supporting an intermediate region of a roof and a roof module. The vehicle roof module has a front extruded cross member adapted to be mounted to a roof of a vehicle body, a first pair of nodes each having a portion received in an end region of the front cross member, a first extruded side rail and a second extruded side rail with each end region of the first and second rails receiving another portion of one of the first pair of nodes, a second pair of nodes each having a portion received in another end region of the first and second rails, a rear extruded cross member adapted to be mounted to the roof of the vehicle body with each end region of the rear cross member receiving another portion of one of the second pair of nodes, a panel mounted to the front cross member, rear cross member, first side rail and second side rail, and an intermediate cross member having a first end mounted to the first side rail and a second end mounted to the second side rail, with the intermediate cross member positioned between the front and rear cross members. Each end region of each side rail defines an interior hollow portion. Each end region of each side rail has at least one nodule extending from the side rail into the hollow portion to maintain a bond gap between the side rail and the node received into the side rail end region for receiving adhesive. The intermediate cross member is generally aligned with the pair of pillars to provide structural support for the vehicle.

In yet another embodiment, a vehicle roof module is provided with a front member having a hollow structure, a flange extending lengthwise along the hollow structure, and at least one raised area extending internally into the hollow structure. The vehicle roof module has a first pair of nodes each received in an end region of the front member. The vehicle roof module has a first side rail and a second side rail, each having a hollow structure, a flange extending lengthwise along the hollow structure, a track for a sunshade extending lengthwise along the hollow structure and generally opposed to the flange, and at least one raised area extending from the first side rail internally into the hollow structure, a first end region of each of the side rails receiving one of the first pair of nodes. The vehicle roof module has a second pair of nodes each received in the second end region of each of the first and second side rails. The vehicle roof module has a rear member having a hollow structure, a flange extending lengthwise along the hollow structure, and at least one raised area extending from the second side rail internally into the hollow structure, each end region of the rear member receiving one of the second pair of nodes. The vehicle roof module has an intermediate member having a hollow structure, a first flange extending lengthwise along the hollow structure, a second flange extending lengthwise along the hollow structure and generally opposed to the first flange, the intermediate member extending between the first and second side rail. The vehicle roof module also has a panel supported by the front member, rear member, and first and second side rail.

A further embodiment discloses that each node has a first tab sized to be received within the hollow structure of one of the side rails and cooperate with the at least one raised area of one of the side rails to provide a gap between the first tab and the interior surface of the hollow structure when the first tab of the node is inserted into one of the side rails.

An even further embodiment discloses that each node has a second tab sized to be received within the hollow structure of one of the front and rear members and cooperate with the at least one raised areas of one of the front and rear members to provide a gap between the second tab and the interior surface of the hollow structure when the second tab of the node is inserted into one of the front and rear members.

A further embodiment discloses that the second tab is generally orthogonal to the first tab.

An even further embodiment discloses that each node has a flange for sealing a joint formed between one of the side rails and one of the front and rear members.

In another embodiment, a vehicle body is provided with a pair of pillars, a roof panel supported by the pillars, a series of extruded rails mounted to the roof panel with each rail having a tubular section with at least one ridge on an interior surface of the tubular section, and a series of nodes received by the end regions of the series of rails to connect the rails.

A further embodiment provides an intermediate member connected to two of the series of extruded rails and generally aligned with the pair of pillars, and a generally transparent panel supported by the series of extruded rails.

An even further embodiment discloses that each node has a first tab sized to fit within the tubular section of one of the rails with the at least one ridge providing a gap between the first tab and the interior surface of the tubular section, and that each node has a second tab sized to fit within one of the cross members sized to fit within the tubular section of one of the cross members with the at least one ridge providing a gap between the second tab and the interior surface of the another tubular section.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
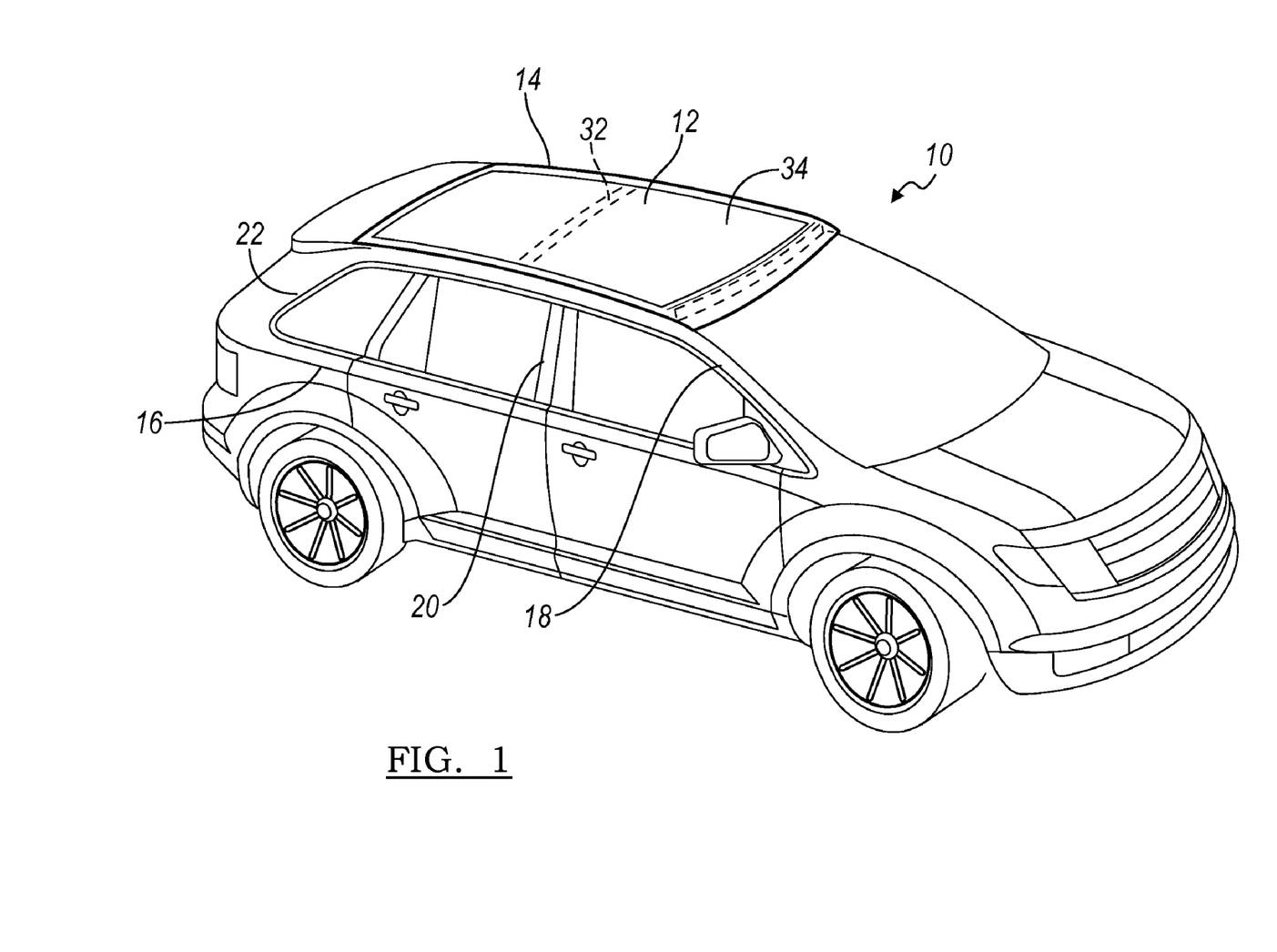
FIG. 1 is a perspective view of a vehicle having a roof module according to an embodiment.

FIG. 1 illustrates a vehicle 10 having a roof module assembly 12. The vehicle 10 is shown as being a crossover vehicle, but other types of vehicles with a roof module assembly are also contemplated, such as a sport utility vehicle, sedan, coupe, or the like. The roof module 12 is placed within an opening in the roof 14 of the vehicle body 16. The roof module 12 may be designed to substantially cover the roof 14 area, or be sized to be smaller than the roof 14. The vehicle body 16 has several pillars to add structural support to the vehicle 10 and support the roof 14 structure. The vehicle 10 is shown as having front pillars 18, intermediate pillars 20, and rear pillars 22, which structurally support the roof 14. In other embodiments using various vehicle designs, other numbers of pillars or pillar configurations are also contemplated.

Figure 2:
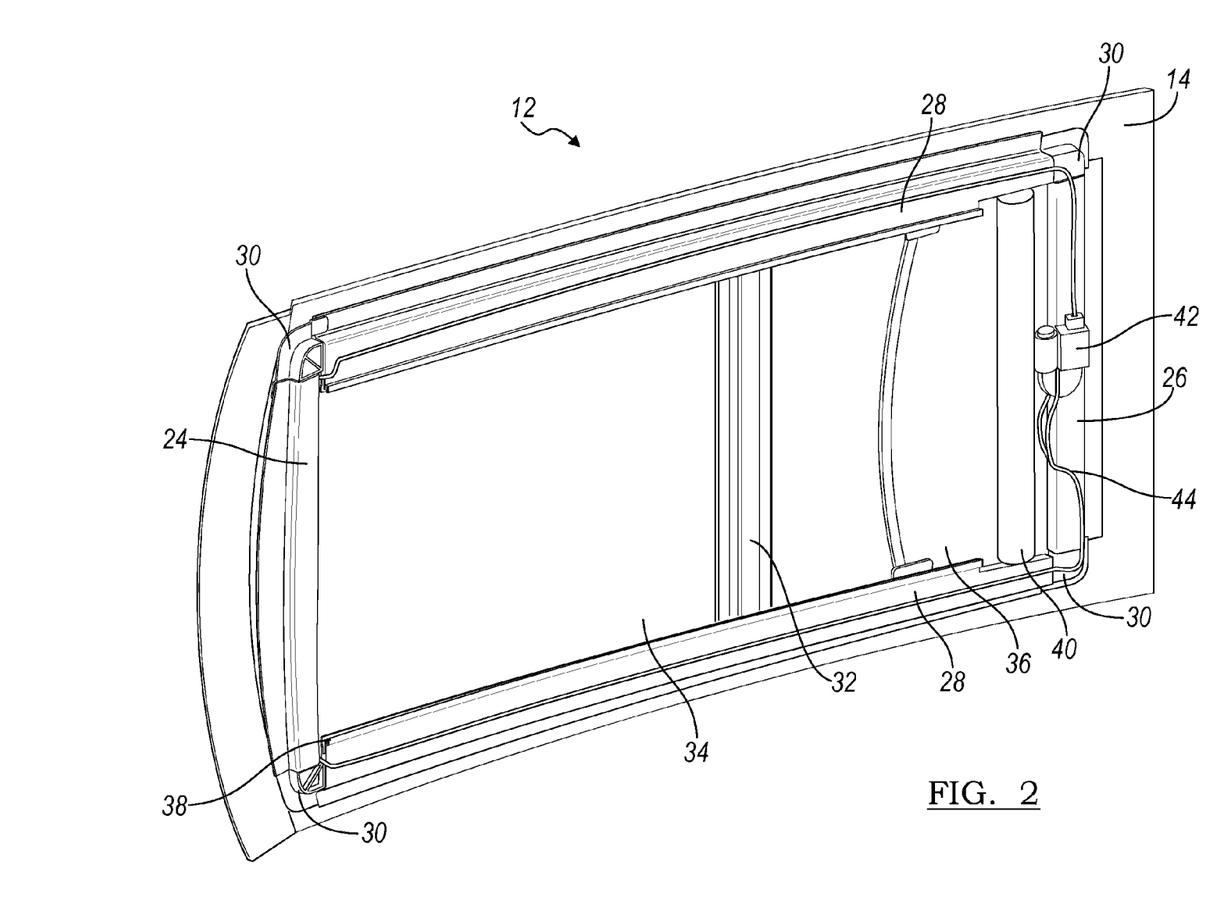
FIG. 2 is a bottom perspective view of the roof module of FIG. 1.

FIG. 2 illustrates the roof module 12 for the vehicle 10 of FIG. 1. The roof module has a front rail 24, rear rail 26, and a pair of side rails 28. The rails 24, 26, 28 are mounted to the roof 14 (in partial view) to connect the roof module 12 to the vehicle 10. The rails may be mounted using adhesive, welding, riveting, or other fastening system or combination as is known in the art. The front rail 24 is oriented towards the forward portion of the vehicle 10, while the rear rail 26 is oriented towards the rearward portion of the vehicle 10. The rails 24, 26, 28 are connected using nodes 30. In one embodiment, the nodes 30 are identical. In another embodiment diagonally opposed nodes 30 are identical, therefore requiring two nodes designs for the four nodes 30 of the roof module 12. In yet another embodiment, front nodes 30 are identical, and rear nodes 30 are identical, therefore requiring two nodes designs for the four nodes 30 of the roof module 12. In other embodiments, the nodes 30 may have different features among them to connect to the rails.

An intermediate rail 32 connects the pair of side rails 28 and is positioned between the front rail 24 and rear rail 26. In one embodiment, the intermediate rail 32 is positioned to be generally aligned with the intermediate pillars 20 of the vehicle 10 shown in FIG. 1. This may enhance the structural properties of the vehicle body 16.

The roof module 12 has a fixed panel 34. The panel is mounted to the front rail 24, rear rail 26, and side rails 28. The panel may additionally be mounted to the intermediate rail 32. The panel 34 is generally transparent to provide for ambient light to enter the interior of the vehicle 10 through the panel 34. The panel may include a tint or other coating. In one embodiment, the panel 34 is made from glass, a plastic material such as acrylic or polycarbonate, or other materials as are known in the art.

In an embodiment, the front rail 24, rear rail 26, side rails 28 and intermediate rail 32 are extruded from a metal such as aluminum, aluminum alloy, magnesium, magnesium alloys, or others as are known in the art. The material choice reduces the weight of the module as well as lowers the center of gravity of the vehicle 10. The extrusion process allows for different length rails 24, 26, 28, 32 to be manufactured for different vehicles without the changes in tooling that are required using a stamping process or other conventional process. For use with various vehicles 10, the same extrusions would be used for the rails 24, 26, 28, 32, but the rails 24, 26, 28, 32 would be cut and shaped to fit the specific vehicle 10.

In an embodiment, a sunshade 36 is included with the roof module 12 to reduce or prevent the transmission of ambient light through the panel 34 and into the vehicle 10 interior. The sunshade 36 is a flexible material such as a fabric, vinyl, or the like. The sunshade 36 interacts with tracks 38 on the side rails 28 to slide along the roof module 12. The sunshade 36 winds around a take-up mechanism 40, such as a roller, which allows for the sunshade 36 to be stored with the panel 34 to be generally uncovered, allows for the sunshade 36 to be deployed with the panel 34 generally covered (as shown in FIG. 2), and also allows the sunshade 36 to be positioned between stored and deployed for intermediate coverage of the panel 34. The take-up mechanism 40 may be manually operated or may be operated using a motor 42 and drive mechanism 44. In one embodiment, a vehicle 10 occupant activates a button or a switch to move the sunshade 36 across the panel 34.

Figure 3:
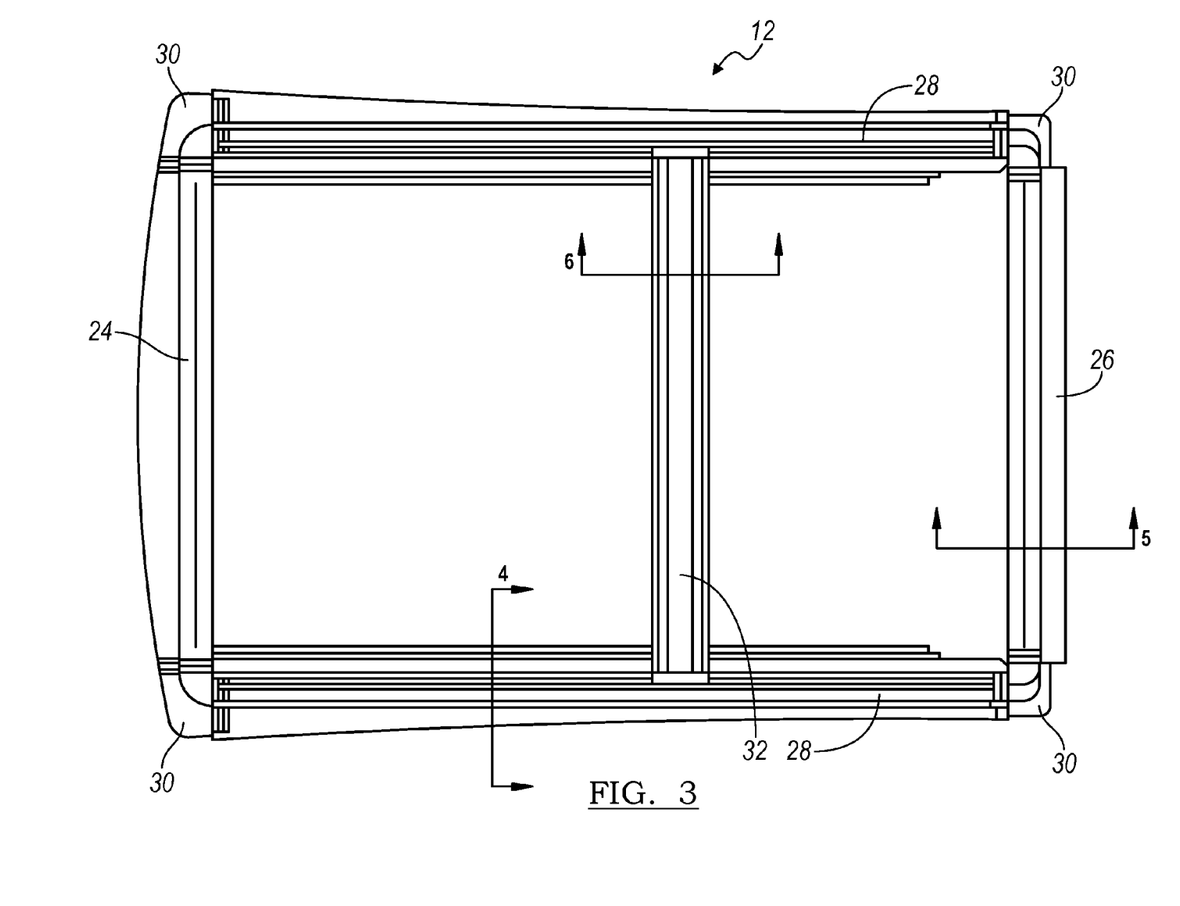
FIG. 3 is a top view of a roof module according to another embodiment.

FIG. 3 illustrates an embodiment of a roof module 12. The roof module 12 has a front rail or front cross member 24, a rear rail or rear cross member 26, and a pair of extruded side rails 28. The rails 24, 26, 28 are connected using nodes 30. An intermediate cross member 32 is connected to the side rails 28.

Figure 4:
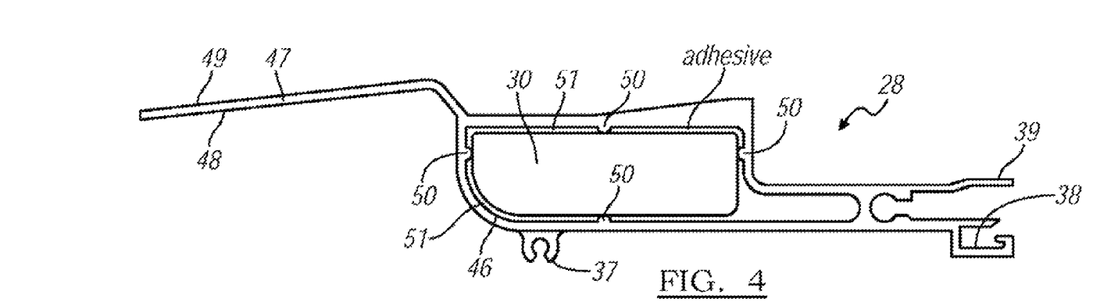
FIG. 4 is a section view of a side rail of the roof module of FIG. 2.

A cross-section of one of the side rails 28 is shown in FIG. 4. The rail 28 has a tubular structure 46, or an interior hollow portion, which extends along the length of the rail 28 to the end regions of the rail 28. A flange 47 extends lengthwise along the structure 46 and is used to mount the rail 28 to the vehicle body 16 using the lower surface 48 of the flange 47. The panel 34 is mounted to the upper surface 49 of the flange 47. A sunshade track 38 and drive cable track 39 extend lengthwise along the structure 46 and generally opposed to the flange 47. A return drive cable track 37 may also be extruded with the side rail 28.

A series of ridges 50, nodules or raised areas extend internally into the tubular structure 46. The ridges 50 may also extend the length of the rail 28. A portion of a node 30 is sized such that it fits into the tubular structure 46. The node 30 is spaced apart from the interior wall of the tubular structure by the ridges 50 to provide a bond gap 51 between the rail 28 and the node 30. The bond gap 51 is used to provide space for an adhesive used to connect the rails and the nodes. The rail 28 may be extruded with the flange 47, the tracks 38, 39, and the ridges 50 as one extrusion. Also, only one extrusion section is necessary for both of the pair of rails 28.

Figure 5:
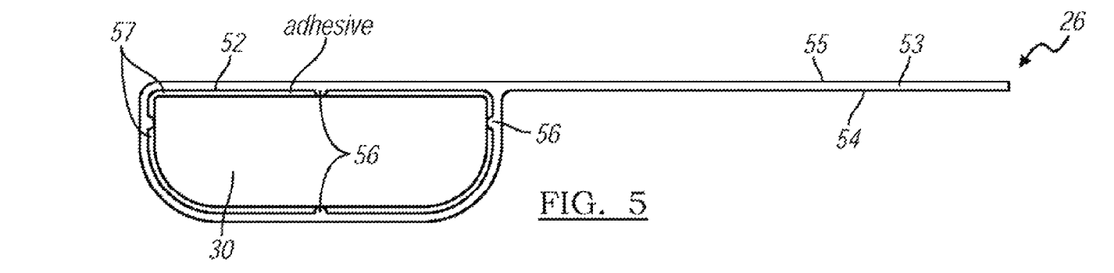
FIG. 5 is a section view of a front or a rear member of the roof module of FIG. 2.

A cross section of the rear rail 26 is shown in FIG. 5. The rear rail 26 and the front rail 24 may be formed from the same extrusion. If the front and rear rail 26 are formed from the same extrusion, the rail 26 may be bent or shaped differently to conform to the vehicle roof 14 shape through a process such as stretch or press bending. Additionally the flange 53 may be machined differently for the front and rear rails 26. The rear rail 26 has a tubular structure 52, or an interior hollow portion, which extends along the length of the rail 26 to the end regions of the rail 26. A flange 53 extends lengthwise along the structure 52. The lower surface 54 of the flange 53 is used to mount the rail 26 to the vehicle body 16. The panel 34 is mounted to the upper surface 55 of the flange 53. A series of ridges 56, nodules or raised areas extend internally into the tubular structure 52. The ridges 56 may also extend the length of the rail 26. A portion of a node 30 is sized such that it fits into the tubular structure 52. The node 30 is spaced apart from the interior wall of the tubular structure by the ridges 56 to provide a bond gap 57 between the rail 26 and the node 30. The bond gap 57 is used to provide space for an adhesive used to connect the rails and the nodes.

Figure 6:
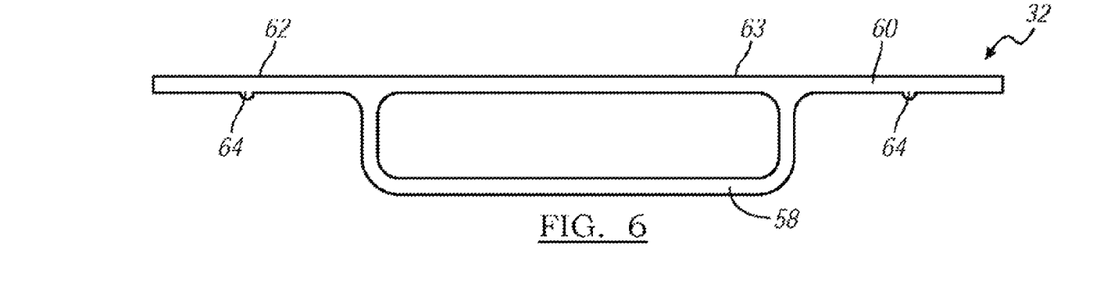
FIG. 6 is a section view of an intermediate cross member of the roof module of FIG. 2.

A cross section of the intermediate cross member 32 is shown in FIG. 6. The intermediate cross member 32 has a tubular structure 58, or an interior hollow portion, which extends along the length of the cross member 32 to the end regions of the cross member 32. A first flange 60 extends lengthwise along the structure 58. A second flange 62 extends lengthwise along the structure 58 and is generally opposed to the first flange 60. The upper surface 63 of the cross member 32 is used to mount the panel 34 to the cross member 32. A series of ridges 64, nodules or raised areas extend from each flange 60, 62 to provide a bond gap for an adhesive used to connect the cross member 32 to the side rails 28.

Figures 7, 8:
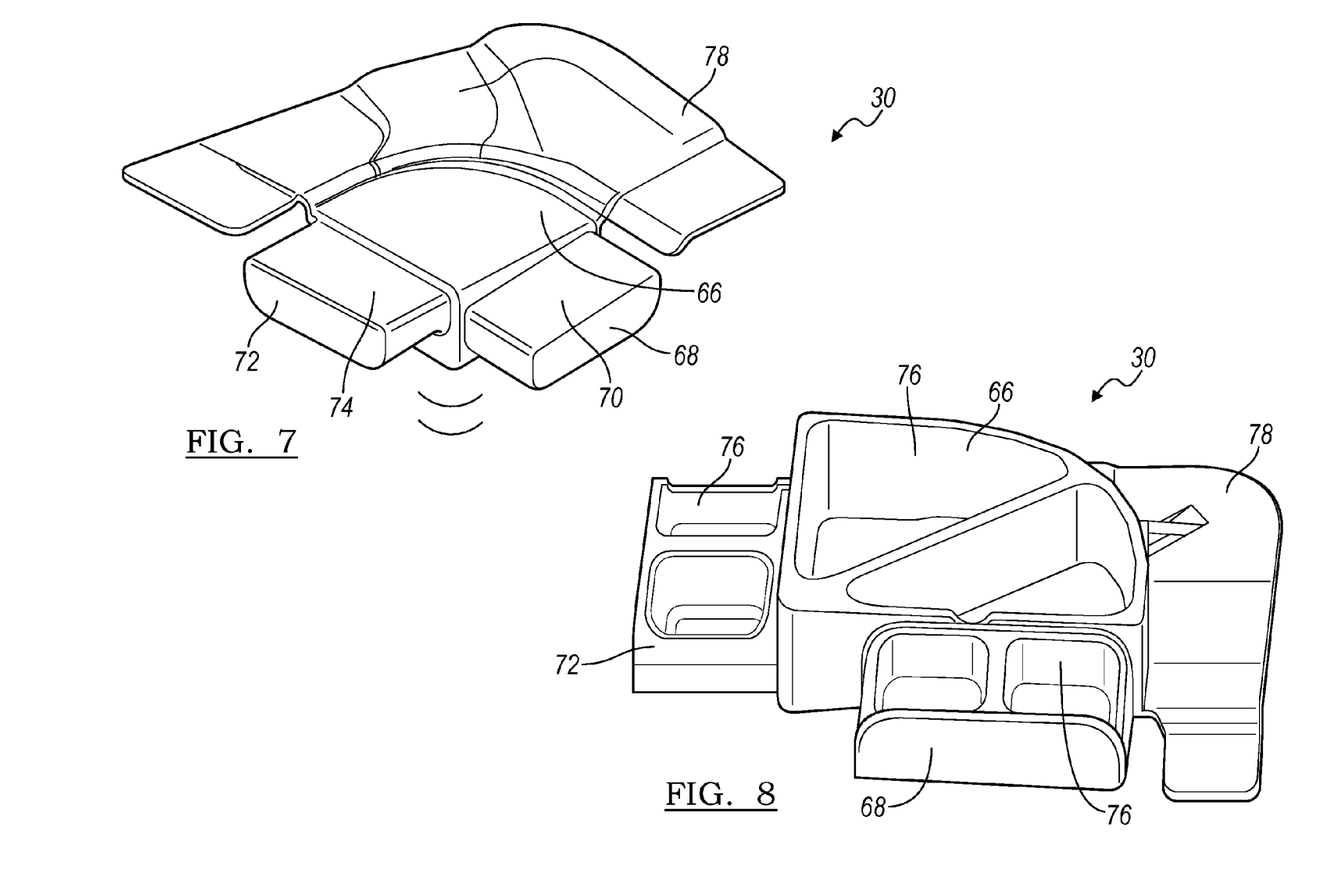
FIG. 7 is a top perspective view of a node for the roof module according to yet another embodiment.
FIG. 8 is a bottom perspective view of the node of FIG. 7.

FIGS. 7 and 8 illustrate an embodiment of a node 30 used to connect the rails of the roof module 12. The node 30 may be used to connect the front rail 24 to a side rail 28 or the rear rail 26 to the side rail 28. In one embodiment, the node 30 is cast from magnesium or a magnesium alloy. Of course, other materials and methods of manufacture are contemplated.

The node 30 has a body portion 66. A first tab 68 extends from the body portion 66 and is sized to fit within the hollow structure of the side rail 28. The outer surface of the first tab 70 forms a bond gap 51 with the interior surface of the structure 46 of the side rail 28 to provide a location for adhesive. The ridges 50 keep the tab 68 spaced apart from the structure 46 to form the bond gap 51.

A second tab 72 extends from the body portion 66 of the node 30 and is sized to be received within the hollow structure 52 of either the rear member or front member 26, 24. The outer surface of the second tab 72 forms a bond gap 57 with the interior surface of the structure 52 of the front or rear rail 24, 26 to provide a location for adhesive. The ridges 56 keep the tab 72 spaced apart from the structure 52 to form the bond gap 57. The first and second tabs 68, 72 may be sized the same as one another. The first tab 68 is generally orthogonal to the second tab 72. The first tab 68 may be oriented differently on the body 66 than the second tab 72 such that the first tab 68 is canted relative to the second tab 72. The body portion 66 and first and second tabs 68, 72 may have recessed areas 76 to aid in manufacturing or reduce weight of the node 30.

A flange 78 also extends from the body portion 66 of the node. The flange 78 may additionally seal the roof module 12 to the vehicle body 16. In one embodiment, the flange may also be used as a mounting point for the panel 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. A vehicle roof module comprising:
a front member having a hollow structure, a flange extending lengthwise along the hollow structure, and at least one raised area extending internally into the hollow structure;
a first pair of nodes, each node having a body portion with a flange extending therefrom, each node received in an end region of the front member;
a first side rail and a second side rail, each having a hollow structure, a flange extending lengthwise along the hollow structure, a track for a sunshade extending lengthwise along the hollow structure and generally opposed to the flange, and at least one raised area extending from the first side rail internally into the hollow structure, a first end region of each of the side rails receiving one of the first pair of nodes;
a second pair of nodes, each node having a body portion with a flange extending therefrom, each node received in the second end region of each of the first and second side rails;
a rear member having a hollow structure, a flange extending lengthwise along the hollow structure, and at least one raised area extending from the second side rail internally into the hollow structure, each end region of the rear member receiving one of the second pair of nodes;

an intermediate member having a hollow structure, a first flange extending lengthwise along the hollow structure, a second flange extending lengthwise along the hollow structure and generally opposed to the first flange, the intermediate member extending between the first and second side rail; and a panel supported by the front member, rear member, and first and second side rail;

wherein each node has a first tab extending from the body portion, the first tab received within the hollow structure of one of the side rails to cooperate with the at least one raised area of one of the side rails to provide a gap between the first tab and the interior surface of the hollow structure when the first tab of the node is inserted into one of the side rails; and wherein each node has a second tab extending from the body portion, a longitudinal axis of the second tab oriented generally orthogonal to a longitudinal axis of the first tab, an upper surface of the second tab canted relative to an upper surface of the first tab, the second tab sized the same as the first tab and received within the hollow structure of one of the front and rear members to cooperate with the at least one raised areas of one of the front and rear members to provide a gap between the second tab and the interior surface of the hollow structure when the second tab of the node is inserted into one of the front and rear members.

2. A vehicle body comprising:

a roof supported by a pair of pillars; and a roof module comprising:

a series of rails mounted to the roof, each rail having a tubular section with at least one ridge on an interior surface of the tubular section;

a series of nodes received by the series of rails to connect the rails, each node comprising a flange for sealing the roof module to the roof;

an intermediate member connected to two of the series of rails; and a generally transparent panel supported by the series of rails;

wherein each node has a first tab sized to fit within the tubular section of one of the rails with the at least one ridge providing a gap between the first tab and the interior surface of the tubular section; and wherein each node has a second tab sized to fit within the tubular section of another of the rails with the at least one ridge providing a gap between the second tab and the interior surface of the another tubular section, the second tab orthogonal to the first tab, and the second tab canted relative to the first tab.

3. The vehicle body of claim 2 wherein the first tab defines a recessed area.

4. The vehicle body of claim 2 wherein the second tab defines a recessed area.

5. The vehicle roof module of claim 2 wherein the flange is substantially planar.

6. The vehicle roof module of claim 5 wherein a portion of an inner edge of the flange is connected to the node.

7. The vehicle roof module of claim 6 wherein another portion of the inner edge of the flange is freestanding.

8. The vehicle roof module of claim 2 further comprising an adhesive to retain the series of nodes and the series of rails.

* * * * *